| United States Patent [19] | [11] | 4,371,678 |
|---|---|---|
| Noël | [45] | Feb. 1, 1983 |

[54] PROCESS FOR RAPIDLY TERMINATING THE POLYMERIZATION OF VINYL CHLORIDE IN AQUEOUS SUSPENSION

[75] Inventor: Stéphane Noël, Grimbergen, Belgium

[73] Assignee: Solvay & Cie., Brussels, Belgium

[21] Appl. No.: 270,581

[22] Filed: Jun. 4, 1981

[30] Foreign Application Priority Data

Jun. 5, 1980 [FR] France .................................. 80 12724

[51] Int. Cl.$^3$ ............................ C08F 2/42; C08F 2/20
[52] U.S. Cl. ....................................... 526/83; 526/85; 526/202
[58] Field of Search ................................... 526/83, 85

[56] References Cited

U.S. PATENT DOCUMENTS 2,662,876 12/1953 Antlfinger ............................ 526/85

FOREIGN PATENT DOCUMENTS 754689 8/1956 United Kingdom ................... 526/83
976896 12/1964 United Kingdom ................... 526/83
1509104 4/1978 United Kingdom ............. 526/344.2

*Primary Examiner*—C. A. Henderson
*Attorney, Agent, or Firm*—Spencer & Kaye

[57] ABSTRACT

Process for rapidly terminating the polymerization of vinyl chloride in aqueous suspension in the presence of lower dialkyl peroxydicarbonates by introducing effective amounts of ammonium hydroxide and an alkali metal thiosulphate, e.g. sodium or ammonium thiosulphate, into the polymerization medium. This process enables polymerization to be quickly and effectively terminated when a breakdown occurs.

5 Claims, No Drawings

PROCESS FOR RAPIDLY TERMINATING THE POLYMERIZATION OF VINYL CHLORIDE IN AQUEOUS SUSPENSION

BACKGROUND OF THE INVENTION

The present invention relates to a process for rapidly terminating the polymerisation of vinyl chloride in aqueous suspension when polymerisation is carried out in the presence of lower dialkyl peroxydicarbonates.

Lower dialkyl peroxydicarbonates are widely used and highly active initiators for the polymerisation of vinyl chloride in aqueous suspension. Because of the exothermic nature of the polymerisation reaction it is advisable to take precautions to keep the reaction effectively under control. In particular the equipment used for this purpose provides for adequate stirring and cooling of the polymerisation medium.

The occurrence of an unforeseen defect in one or more of the control means during polymerisation leads to a runaway reaction which, due to the resulting uncontrollable increase in the temperature of the reaction medium, results at best in degradation of the polymer. If the runaway polymerisation cannot be rapidly brought under control far more serious trouble may result such as rupture of the bursting disc on the autoclave and the loss of monomer and polymer.

For reasons of safety and economy it is therefore essential for effective means to be available for rapidly terminating the polymerisation of vinyl chloride in aqueous suspension in the presence of lower dialkyl peroxydicarbonates should this prove to be necessary. The larger the capacity of the polymerisation reactor the more essential it is for such means to be provided.

It is generally known that polymerisation in the heterogeneous phase can be terminated by adding inhibitors consisting of inorganic reducing agents such as sodium bisulphite and dithionite, hydroxylamine or hydrazine to the polymerisation medium when the desired conversion has been achieved (Houben Weyl, Methoden der Organischen Chemie, Makromolekulare Stoffe, Part 1, pp. 434–435).

It has also been proposed to deactivate lower dialkyl peroxydicarbonates used in the polymerisation of vinyl chloride in aqueous suspension by adding basic substances such as alkali and alkaline earth metal and ammonium hydroxides, carbonates and bicarbonates to the polymerisation medium (Belgian Patent 846 908 filed on 4 October 1976 in the name of SOLVAY & Cie).

However, the prior art deactivators and inhibitors of the reducing agent type have proved to be insufficiently active for effectively and rapidly terminating the polymerisation of vinyl chloride in aqueous suspension in the presence of lower dialkyl peroxydicarbonates, particularly when conversion is still low.

SUMMARY OF THE INVENTION

The object of the present invention is to provide particularly effective inhibitors for the polymerisation of vinyl chloride in aqueous suspension that can be used throughout the polymerisation cycle, i.e., at both low and high conversions.

Accordingly, the present invention provides a process for rapidly terminating the polymerisation of vinyl chloride in aqueous suspension in the presence of lower alkyl peroxydicarbonates in which effective amounts of ammonium hydroxide and an alkali metal or ammonium thiosulphate are introduced into the aqueous suspension.

DETAILED DESCRIPTION OF THE INVENTION

The pairs of inhibitors according to the present invention can be used for terminating polymerisation even when the vinyl chloride monomer content of the reactor is still relatively very high and there is considerable risk of explosion should the reaction run away. They can also be used for terminating polymerisation under the normal operating conditions when the desired conversion has been achieved.

The high activity of the pairs of inhibitors used in the present invention is surprising in view of the fact that alkali metal and ammonium thiosulphates are intrinsically not very effective inhibitors. The activity of these inhibitor pairs is therefore due to a synergistic effect.

The amount of ammonium hydroxide and thiosulphate to be introduced into the aqueous medium to terminate polymerisation is not particularly critical. It depends to some extent on the polymerisation temperature, the pH of the polymerisation medium and the stage the polymerisation has reached when the inhibitor pair is introduced.

In practice, as little as about 50 parts by weight per million (ppm) of ammonium hydroxide, expressed as ammonia, mixed with about 20 ppm of thiosulphate in relation to the amount of vinyl chloride initially used will be sufficient to block polymerisation within an acceptable period.

It is obvious, however, that introducing larger amounts of ammonium hydroxide and thiosulphate will enable polymerisation to be terminated even more quickly. Nevertheless, it is advisable not to exceed contents of 10,000 ppm of ammonium hydroxide (expressed as ammonia) and thiosulphate in order to avoid contaminating the polymer unnecessarily. Generally speaking, contents of 1000 ppm of ammonium hydroxide (expressed as ammonia) and thiosulphate are not exceeded. It is preferable to use from 125 to 500 ppm of ammonium hydroxide, expressed as ammonia, and from 20 to 750 ppm of thiosulphate calculated on the amount of vinyl chloride employed.

All alkali metal or ammonium thiosulphates can be used for carrying out the process of the invention. Preference is given, however, to sodium thiosulphate and more particularly technical grade sodium thiosulphate of formula $Na_2S_2O_3.5H_2O$.

The inhibitors may be introduced in any desired way either all at once or in stages, together or separately. The ammonium hydroxide may also be prepared in situ by introducing an appropriate amount of ammonia. It is preferable to use ammonium hydroxide, however.

The process according to the invention can be used in the polymerisation of vinyl chloride in aqueous suspension in the presence of lower dialkyl peroxydicarbonates as catalysts.

By lower dialkyl peroxydicarbonates we mean dialkyl peroxydicarbonates whose alkyl chains, which may be the same or different, and may optionally be substituted, e.g. by halogens, contain from 1 to 6 carbon atoms and usually from 1 to 4 carbon atoms. Good results have been obtained by using diethyl peroxydicarbonate conjointly with the process according to the invention.

The process according to the invention can also be used when polymerisation is carried out in the presence of the conventional ingredients for polymerisation in aqueous suspension, i.e. dispersing agents and optionally emulsifying agents, together optionally with sundry additives added at any stage of the polymerisation such as stabilizers, plasticisers, colorants, reinforcing agents or processing aids.

By polymerisation of vinyl chloride we mean the homopolymerisation of vinyl chloride and the copolymerisation of monomer mixtures containing a preponderance and preferably more than 80% molar of vinyl chloride, as for example mixtures of vinyl chloride and vinyl acetate, propylene or ethylene.

The process according to the invention can be used more particularly for terminating the polymerisation of vinyl chloride in aqueous suspension in the presence of dialkyl peroxydicarbonates in large capacity reactors.

The following illustrative examples relate to the homopolymerisation of vinyl chloride.

Examples 1 to 3 relate to termination at the end of polymerisation under normal conditions (80% conversion).

Examples 4 and 5 relate to termination when the stirrer stops at only 30% conversion.

The plasticiser uptake time at 75° C. (DPP) and the amount of plasticiser absorbed (diethylhexyl phthalate) are determined under the usual conditions. The more effectively polymerisation is terminated the shorter will be the plasticiser uptake time and the smaller the amount of plasticiser absorbed.

EXAMPLE 1

750 Kg of demineralised water, 1.2 Kg of polyvinyl alcohol and 0.28 Kg of diethyl peroxydicarbonate are introduced at room temperature under reflux into a 3.5m$^3$ reactor provided with a stirrer, a thermostatically controlled double jacket and a reflux condenser. The reactor is closed, the stirrer stopped and the reactor placed under partial vacuum (13,332.2 Pa absolute) and then purged with nitrogen (79 993.2 Pa absolute) before restoring the same partial vacuum.

The temperature of the cooling fluid in the condenser is programmed at 65° C. The stirrer is restarted and 1000 Kg of vinyl chloride are introduced, together with 750 Kg of water superheated initially to 180° C., but the last 100 Kg being introduced at a decreasing temperature in order to achieve a temperature of 61° C. in the polymerisation medium when charging ends. This point is regarded as being the start of the full polymerisation cycle ($t_o$). The temperature of the medium is maintained at 61° C. throughout polymerisation. A few minutes after polymerisation starts the temperature of the condenser is programmed to fall to 30° C. at a rate of 1° C. per minute.

After 2 hours 30 minutes polymerisation, 300 liters of water are injected. All feeds in excess of 100 liters are introduced at a rate that increases at the start and decreases at the end of introduction.

3 hours 15 minutes after polymerisation starts (80% conversion), 0.5 Kg of ammonium hydroxide and 0.05 Kg of technical grade sodium thiosulphate ($Na_2S_2O_3.5H_2O$) dissolved in 10 liters of water are introduced into the aqueous suspension.

20 hours after the injection of the inhibitors the maximum pressure drop achieved, counting from the moment of injection $t_i$, is 147 099.75 Pa and the final conversion is 85.9%. The monomer is vented, the suspension cooled and the polymer recovered by centrifuging and drying. Its plasticiser uptake time at 75° C. and the amount of plasticiser absorbed are determined.

EXAMPLE 2

This Example, which is included for purposes of comparison, is carried out in the same way as Example 1 except that only ammonium hydroxide is used to terminate polymerisation.

EXAMPLE 3

This Example, which is again included for purposes of comparison, is carried out in the same way as Example 1 except that only technical grade sodium thiosulphate is used to terminate polymerisation.

The conditions under which polymerisation is terminated and the characteristics of the resin obtained in Examples 1, 2 and 3 are presented in Table I.

A comparison of the results obtained from Examples 1, 2 and 3 clearly illustrates the unforeseeably superior activity of the inhibitor pair ammonium hydroxide/sodium thiosulphate.

EXAMPLE 4

This Example is carried out under the same conditions as those of Example 1 except that polymerisation is conducted at 71° C. and stirring is stopped at the moment the inhibitor pair is injected, i.e. at $t_o+30$ minutes (conversion: 30%).

In order to induce some degree of turbulence in the reactor it is briefly vented (pressure differentials of 9806.65 Pa) after 3, 6, 10 and 15 minutes.

EXAMPLE 5

This Example is included for purposes of comparison. It is carried out in the same way as Example 4 in all respects except that only ammonium hydroxide was used for terminating polymerisation.

The operating details and the results of terminating the polymerisation reaction in Examples 4 and 5 are presented in Table II.

TABLE I

| Example No. | Amount of Inhibitor NH$_4$OH Kg | Amount of Inhibitor Na$_2$S$_2$O$_3$.5H$_2$O Kg | Maximum pressure drop Pa* | Final Conversion % | DPP at 75° C. min,sec | Amount of plasticiser absorbed, % after 30 mins |
|---|---|---|---|---|---|---|
| 1 | 0.5 | 0.05 | 147 099,75 after 20 hours | 85.9 | 10 min | 97 |
| 2 | 0.5 | — | 392 266 after 20 hours | 87.4 | 16 min, 35 sec | 73 |
| 3 | — | 0.05 | 578 592.35 after 12 hours | 94.3 | >30 min | <30 |

*Starting from $t_i$

TABLE II

| Ex-ample No. | Amount of Inhibitor NH₄OH Kg | Amount of Inhibitor Na₂S₂O₃.5H₂O Kg | Maximum pressure increase Pa* | Final Conversion % |
|---|---|---|---|---|
| 4 | 1 | 1 | 264 779.55 after 6 min | 37 |
| 5 | 1 | 0 | 421 685.95 after 10 min | 40 |

*Starting from $t_i$

What is claimed is:

1. Process for rapidly terminating the polymerisation of vinyl chloride in aqueous suspension in the presence of a lower dialkyl peroxydicarbonate, comprising introducing into the aqueous suspension amounts of ammonium hydroxide and a thiosulfate of an alkali of metal or ammonium sufficient to effectively terminate the polymerisation.

2. Process as defined in claim 1, wherein the amount of ammonium hydroxide, expressed as ammonia, introduced is at least 50 ppm and the amount of thiosulphate is at least 20 ppm calculated on the vinyl chloride employed.

3. Process as defined in claim 1, wherein the amount of ammonium hydroxide, expressed as ammonia, introduced does not exceed 100 ppm, and the amount of thiosulfate does not exceed 1000 ppm calculated on the vinyl chloride employed.

4. Process as defined in claim 1 or 2, wherein the amount of ammonium hydroxide, expressed as ammonia, introduced is between 125 and 500 ppm, and the amount of thiosulfate is between 20 and 70 ppm, calculated on the amount of vinyl chloride employed.

5. Process as defined in any of claims 1 to 3, wherein the thiosulphate is sodium thiosulphate.

* * * * *